United States Patent [19]

Fleckenstein

[11] 4,095,064

[45] June 13, 1978

[54] PADDLE FOR USE IN A ROTATING-PADDLE BIN LEVEL INDICATOR

[75] Inventor: Paul P. Fleckenstein, Port Huron, Mich.

[73] Assignee: Bindicator Company, Port Huron, Mich.

[21] Appl. No.: 727,273

[22] Filed: Sep. 27, 1976

[51] Int. Cl.² ............................................. H01H 35/00
[52] U.S. Cl. ................................................. 200/61.21
[58] Field of Search ........................... 200/61.2, 61.21; 340/24 C; 259/106, 108

[56] References Cited

U.S. PATENT DOCUMENTS

| 3,322,403 | 5/1967 | Murphy | 259/106 |
| 3,436,059 | 4/1969 | Donaldson | 259/108 |
| 3,510,861 | 5/1970 | McIver et al. | 200/61.21 X |
| 3,542,982 | 11/1970 | Gruber | 200/61.21 |

Primary Examiner—James R. Scott
Attorney, Agent, or Firm—Barnes, Kisselle, Raisch & Choate

[57] ABSTRACT

Apparatus for indicating the level of flowable material in a storage bin comprising a motor rotatably suspended within a protective enclosure and having a driveshaft directly coupled to a paddle disposed within the bin to engage material therein. A nipple extending from the enclosure is threadably received within a gland carried by a bin wall with the paddle extending into the bin space. The paddle comprises a hollow tube curved at a fixed radius over an arc of substantially ninety degees, and then flattened or pinched at one end thereof over an arc of about fifty degrees to form a closed bill which may be inserted through the mounting gland.

4 Claims, 7 Drawing Figures

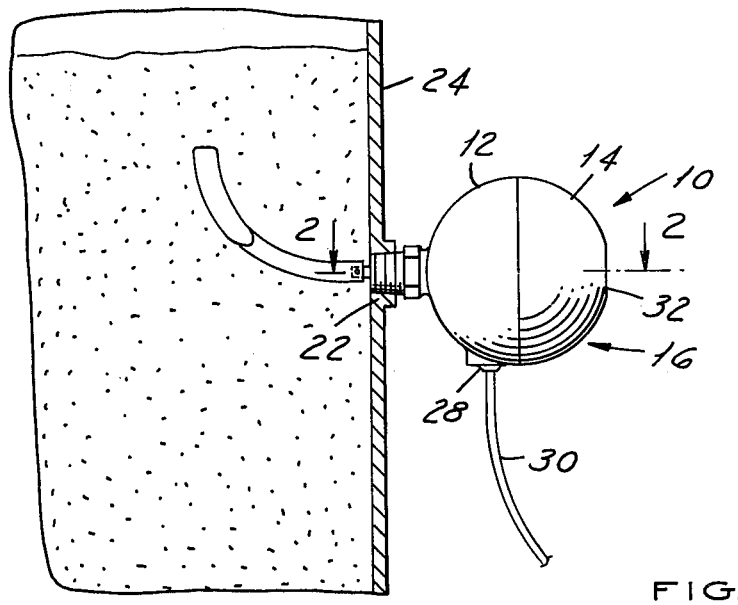
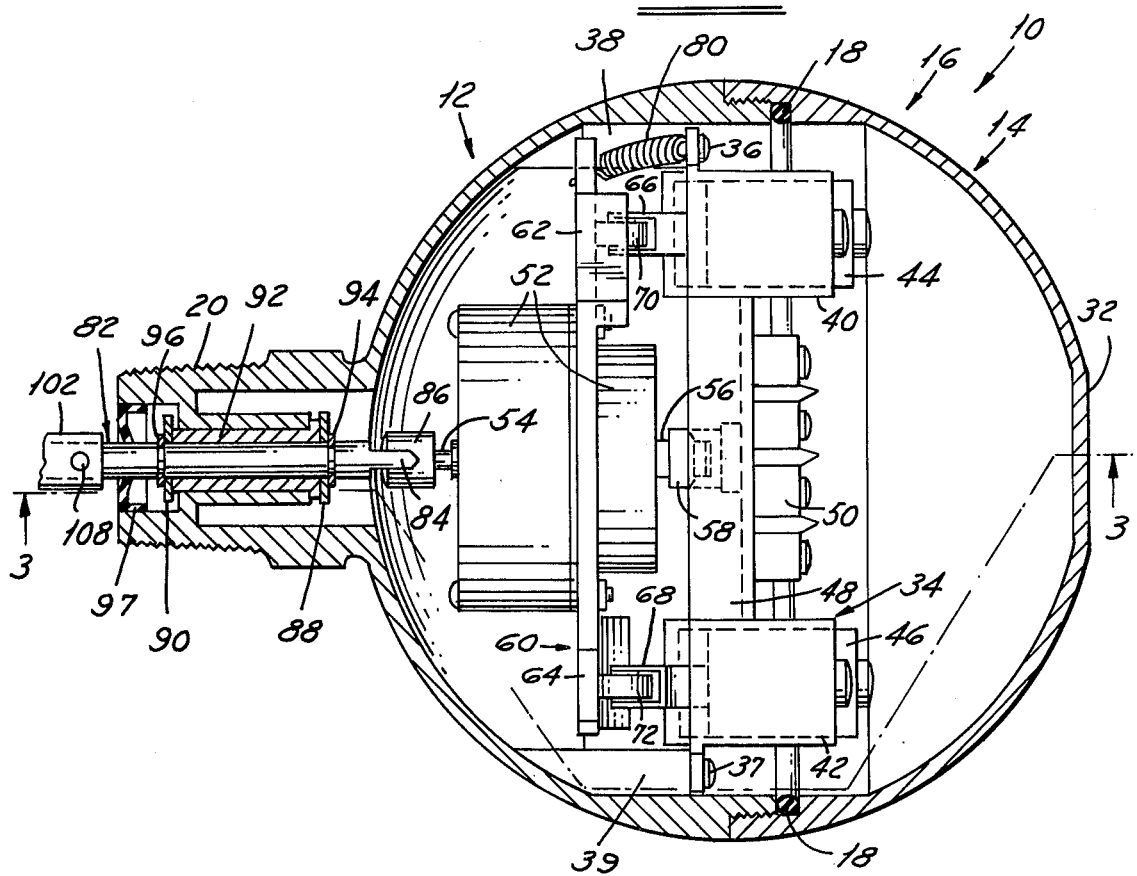

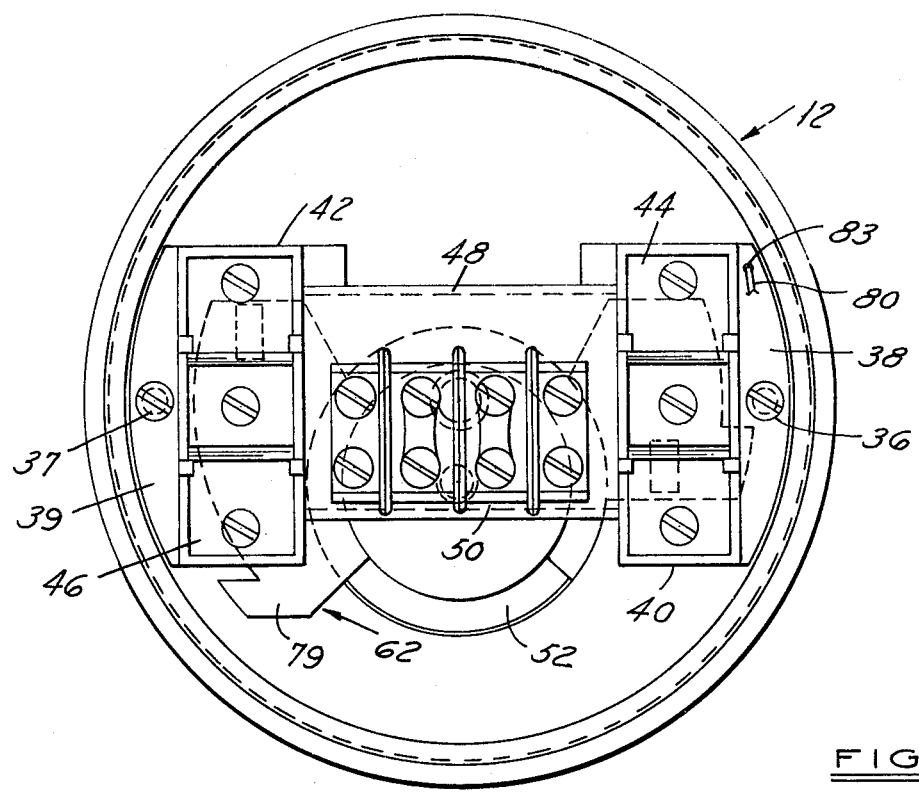
FIG. 5
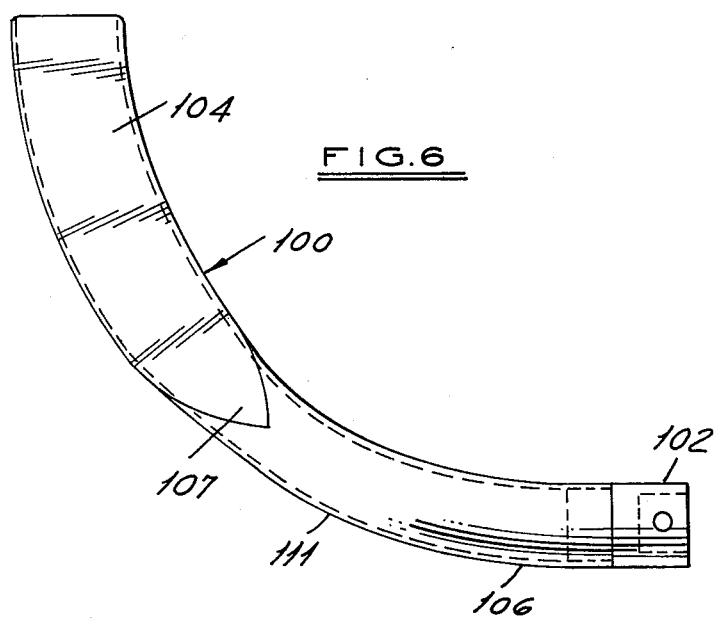
FIG. 6
FIG. 7

4,095,064

PADDLE FOR USE IN A ROTATING-PADDLE BIN LEVEL INDICATOR

BACKGROUND OF THE INVENTION

The present invention relates to bin level indicators and, more particularly, to improvements in apparatus of the rotating paddle type for indicating the level of flowable material in a storage tank or bin. Specifically, the invention relates to an improved paddle for use in apparatus of the referenced type.

Bin level indicators of the above-referenced type typically comprise a motor carried for limited rotation within a protective enclosure and connected to a rotatable paddle which is adapted to engage flowable material within a storage bin when the material rises to the bin level at which the rotating paddle is disposed. The material drag on the paddle causes the motor drive torque to rotate the motor rather than the paddle, which rotation is normally sensed by one or more switches carried within the enclosure. The switches may be connected to deactivate a conveyor feeding material to the bin, or to perform other control functions related to material level. Two examples of bin level indicators of the described type are shown in Grostick U.S. Pat. No. 2,851,553 and Gruber U.S. Pat. No. 3,542,982.

SUMMARY OF THE INVENTION

It is an object of the present invention to provide an improved rotating paddle bin level indicator which is more economical to fabricate and assemble than are prior art indicators of similar type.

It is a specific object of the present invention to provide an improved paddle for a rotating-paddle bin level indicator which is adapted to be inserted into a material bin through a relatively small indicator mounting gland, and is thus of the type shown in the prior art U.S. Pat. Nos. to Obenshain 2,680,298, Murphy 3,322,403 and Donaldson 3,436,059, as well as in the above-mentioned Gruber patent.

BRIEF DESCRIPTION OF THE DRAWINGS

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 1 is an elevational view, partly in section, showing a presently preferred embodiment of the bin level indicator provided by the invention;

FIG. 2 is a sectional view taken along the line 2—2 of FIG. 1;

FIGS. 4 and 5 are sectional views taken along the lines 4—4 and 5—5 of FIG. 3, respectively; and FIGS. 6 and 7 are respective side and end views of the improved paddle provided by the invention and shown in FIG. 1.

DETAILED DESCRIPTION OF THE PREFERRED EMBODIMENTS

Figure 3:
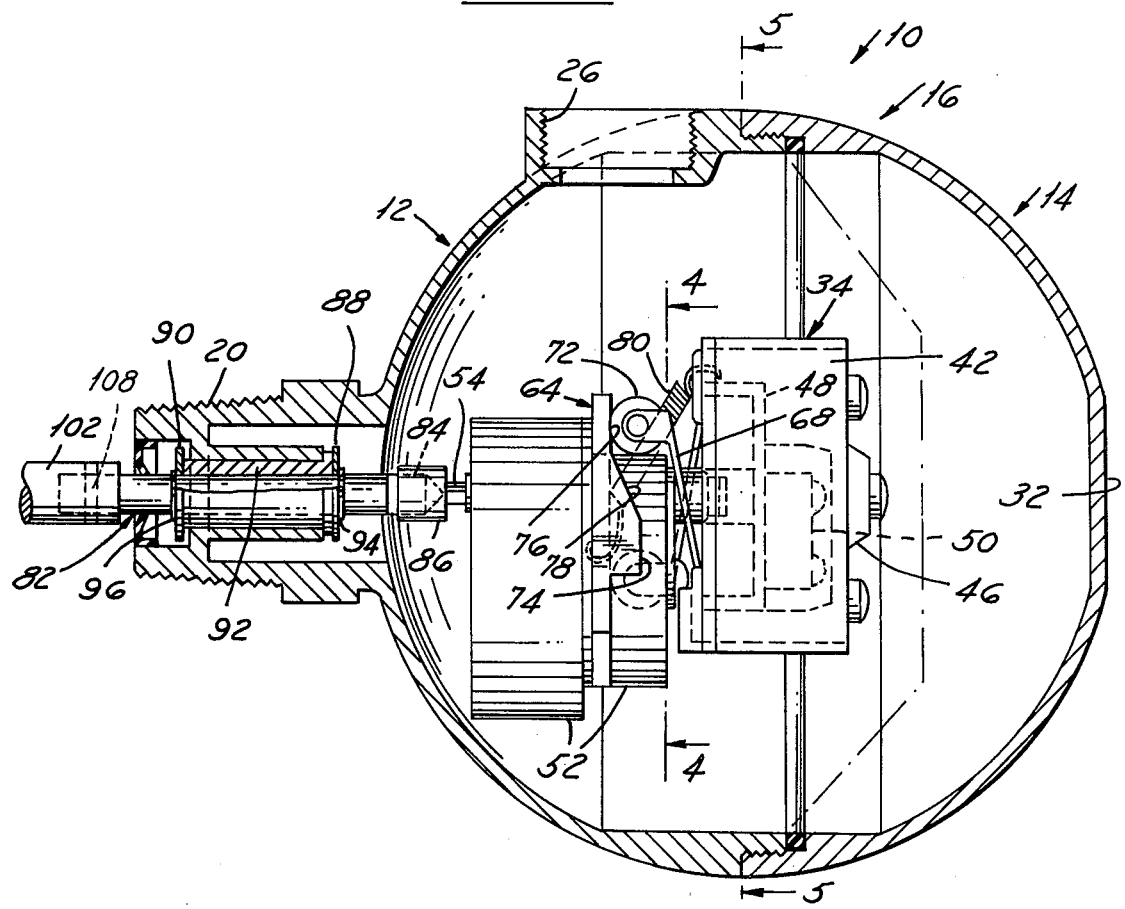
FIG. 3 is a sectional view taken along the line 3—3 of FIG. 2.

Referring to the drawings, the preferred embodiment 10 of the bin level indicator provided herein includes two plastic injection-molded hemispheres 12,14 threaded at their respective open rims and adapted to be interengaged to form a compact spherical housing 16. An annular resilient O-ring 18 (FIG. 2) is crushed between the rims of respective hemispheres 12,14 upon threaded interengagement thereof to seal the internal structure of indicator 10 from the outside atmosphere. A hollow externally threaded nipple 20 is formed at the zenith of hemisphere 12, and is adapted to be threadably received in a corresponding internally threaded gland 22 carried by the wall of a material storage tank or bin 24 (FIG. 1). An internally threaded hole 26 (FIG. 3) is formed adjacent the rim of nippled hemisphere 12 to receive a strain relief grommet 28 (FIG. 1), through which is fed a multiconductor electrical cable 30 adapted for connection to level indicating apparatus disposed within housing 16. A flat or plane region 32, upon which indicator 10 may be rested during storage, is formed on the outer surface of hemisphere 14 at the zenith thereof.

Internally, indicator 10 includes a molded plastic switch bracket 34 (FIGS. 2 and 3) centrally bridging, and mounted by means of screws 36,37 received into correspondingly threaded openings in the shoulders 38,39 adjacent to the open rim of nippled hemisphere 12. Switch bracket 34 comprises a pair of generally rectangular switch cups 40,42 molded at respective ends of bracket 34 and adapted to receive by press-fit a pair of conventional electrical switches 44,46 having preselected outside rectangular geometries. A bridge 48 connects bracket switch cups 40,42, and has mounted thereon remotely of nipple 20 a terminal block 50 for electrical interconnection of the internal indicator components to external monitoring and control circuitry (not shown) via cable 30 (FIG. 1). Switch bracket 34 is fabricated such that bridge 48 is recessed with respect to the open ends of switch cups 40,42 to minimize the possibility of wires or terminals on block 50 touching the inside of opposing hemisphere 14. This feature will be discussed in greater detail hereinafter.

Figure 4:
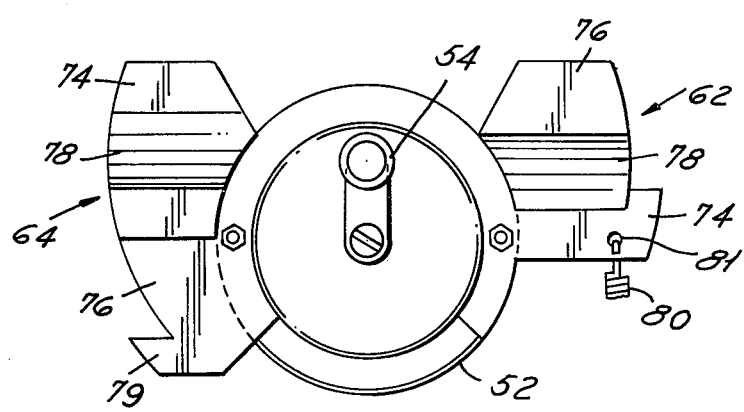

A AC motor 52 having an eccentrically-carried driveshaft or rotor 54 is suspended from switch bracket 34 by means of an axially extending projection 56 of shaft 54 being press-fitted into a corresponding cup 58 integrally formed on the underside of bracket bridge 48. A generally symmetrical switch-actuating cam plate 60 (FIGS. 2, 3 and 4) is carried by and extends radially from respective sides of motor 52 for cooperative engagement between oppositely disposed cam surfaces 62,64 on bracket 60 and respective bracket-mounted switches 44,46. Switches 44,46 include actuator arms 66,68 extending through corresponding apertures in the bases of switch cups 40,42, and terminating in roller followers 70, 72 adapted to follow the contour of respective cam surfaces 62,64 as the motor and cam plate are rotated, the electrical condition of each respective switch being responsive to the position of the associated follower on the opposing cam surface. Cam surfaces 62,64 include radially opposed lower and upper flat dwell portions 74, 76 (FIGS. 3 and 4) at the respective ends of the follower ramps 78 so that motor 52 and cam plate 60 may rotate slightly in response to transient bin conditions without changing the states of respective switches 44,46. A coiled return spring 80 has one end hooked through an aperture 81 in cam plate 60 (FIG. 4) and the other end held in fixed position relative to the cam plate in an aperture 83 (FIG. 5) in hemisphere shoulder 38. A projecting dog 79 is formed on cam surface 64 and cooperates with hemisphere shoulder 39 to provide a stop, and to thus limit corotation of motor 52 and cam plate 60.

A driveshaft 82 (FIG. 2) has a flat blade-like projection 84 received and pinned in a corresponding fitting 86 at the outer end of motor shaft 54. Shaft 82 extends from fitting 86 through a pair of axially spaced thrust washers 88,90 carried within mounting nipple 20, and through a sleeve bearing 92 disposed between thrust washers 88,90, respectively. A pair of grip rings 94,96 retain washers 88,90 in abutting relation to opposed ends of sleeve bearing 92. A protective lip seal 97 surrounds shaft 82 within mounting nipple 20. Indicator 10, as thus far disclosed, is the subject of the copending application of Patrick L. Briggs, Ser. No. 727,274 now abandoned filed concurrently herewith and having a common assignee.

As best seen in FIGS. 6 and 7, the paddle 100 provided in accordance with the present invention comprises a hollow cylindrical tube curved at a fixed radius over an arc of substantially ninety degrees, and then flattened or pinched at one end thereof over an arc of about 50° such that opposed flattened tube walls 103,105 form a closed bill 104 coplanar with the tube axis. Flattened walls 103,105 flare at 107,109 into an unpinched portion 111 of the curved tube which, in turn, is contiguous with the open cylindrical tube end 106. A coupler fitting 102 is inserted into open tubular end 106 of paddle 100 and adhered thereto by one or more spot welds around the outer tube circumference. Fitting 102 is received over the projecting end of driveshaft 82, and is mounted thereto by a pin 108. The raw tube stock for paddle 100 is preferably selected such that the maximum width of the arched paddle, i.e., the width of bill 104, is small enough to be inserted through gland 22 (FIG. 1). Paddle 100 is preferably formed of stainless steel. Alternatively, paddle 100 may be formed of slightly resilient material, such as synthetic rubber. The alternative paddle material is particularly useful where it is anticipated that stored material may be poured or splashed upon the paddle, in which circumstance the resiliency of the paddle will absorb the shock of material contact, and thus help prevent false level indications.

To mount indicator 10 to bin 24, paddle 100 is first pinned to driveshaft 82, either at the factory or at the bin site, and hemispheres 12,14 are threadably disengaged. Paddle 100 is then inserted through gland 22, and nipple 20 is threaded into the gland to fixedly mount hemisphere 12 to the bin wall. With hemisphere 14 detached, cable 30 (FIG. 1) is then fed through strain relief grommet 28, and the various conductors in the cable are connected to appropriate terminals of the internal apparatus. For example, the conductors of cable 30 providing motor-drive current are conducted to the terminals of terminal block 50. Similarly, the cable conductors which are to carry the information of bin level condition are connected to appropriate terminals of switches 44,46 best seen in FIG. 5. Seal 18 and hemisphere 14 are then fitted over and threadably engaged with hemisphere 12, and the bin level indicator 10 is ready for operation.

In operation, power is continuously applied to motor 52 providing drive torque to shaft 82 and paddle 100. If the material is below the level of the paddle, the paddle will freely rotate, and motor 52 and cam plate 60 will be biased by spring 80 into the normal positions thereof indicated in the drawings. When the material in bin 24 rises to the level of paddle 100, the material exerts a drag on the paddle retarding rotation thereof. With paddle 100 thus held in fixed position, the drive torque developed by motor 52 overcomes the force of return spring 80, and causes corotation of the motor and cam plate 60 about the axis of motor shaft 54 against the force of return spring 80. Such rotation is continued over an arc sufficient to actuate switches 44,46, until stop 79 abuts hemisphere shoulder 39. The motor and paddle are then both held in fixed position relative to the shaft axis by stop 79 and the motor is stalled until such time as the material no longer blocks rotation of the paddle, whereupon the paddle is again free to rotate and the motor and attached cam plate are returned by spring 80 to the positions depicted in the drawings.

The several advantages of the indicator herein described will be evident from the foregoing description. For example, switches 44,46, terminal block 50 and motor 52 may be purchased as off-the-shelf components. Hemispheres 12,14, bracket 34 and cam plate 60 are each preferably formed of relatively inexpensive injection-molded plastic material. Moreover, in the indicator herein described, the need for some of the more expensive component parts and assemblies of prior art bin level indicators has been eliminated. For example, in the described indicator, the conventional roller bearing for journaling rotation of the output driveshaft has been replaced by a relatively less expensive sleeve bearing 92. Similarly, the preferred AC motor 52 not only replaces the relatively more expensive gear-drive motor indicative of the prior art, but because the AC motor may be held in the stalled condition for a relatively long period of time without sustaining permanent damage, motor 52 may be coupled through a direct drive connection to paddle 100, i.e., by shaft 82, rather than through the usual clutch mechanism as in the prior art.

The disclosed indicator also has several, perhaps more subtle, advantages over prior art bin level indicators of the rotating paddle type. For example, by locating bridge 48 in recessed position relative to the open ends of switch cups 40,42, the terminals of block 50 are separated from the opposing inside surface of hemisphere 14 by a substantial air gap, such that the usual cardboard insulator cover for the terminal block need not be provided. Moreover, in the preferred form of the invention, the hemispheres 12,14 are formed of insulating material, i.e., plastic, so that even if any of the internal leads or terminals should touch the opposing inside wall of the housing, such lead or terminal will be insulated for electrical ground by the housing itself. Paddle 100 provided by the invention herein is economical to fabricate, and the preferred stainless steel embodiment of the paddle has exhibited satisfactory strength characteristics without the use of the strengthening corrugations required in the paddle disclosed in the above-referenced Gruber patent.

The invention claimed is:

1. In a material bin level indicator of the type comprising an indicator housing having a mounting nipple extending therefrom adapted to engage a corresponding gland on a bin wall for mounting said housing, a motor carried within said housing and operatively coupled to a driveshaft having an axis of rotation extending through said nipple, and a paddle operatively coupled to and extending from said shaft to a free end of said paddle; the improvement wherein said paddle comprises a curved hollow cylindrical tube having a tubular portion adjacent said shaft and a flattened portion comprising opposed tube walls flattened in a plane coplanar with said axis and flaring into said tubular portion, and means disposed within said tubular portion for coupling said paddle to said shaft, both said tubular and said flattened portions being curved at fixed radius from adjacent said coupling means over an arc of substantially ninety degrees, said flattened portion extending over substantially fifty degrees of said arc and terminating at said free end, said paddle being dimensioned such that the same may be inserted into a bin through the mounting nipple while said paddle is coupled to said shaft.

2. The apparatus set forth in claim 1 wherein said paddle is formed of stainless steel material.

3. The apparatus set forth in claim 1 wherein said paddle is formed of resilient material.

4. The apparatus set forth in claim 3 wherein said resilient material is synthetic rubber.

* * * * *

UNITED STATES PATENT AND TRADEMARK OFFICE
CERTIFICATE OF CORRECTION

PATENT NO. : 4,095,064
DATED : June 13, 1978
INVENTOR(S) : Paul P. Fleckenstein

It is certified that error appears in the above-identified patent and that said Letters Patent are hereby corrected as shown below:

On the Abstract Page, change the name of the inventor from "Paul P. Fleckenstein" to -- Phillip P. Fleckenstein --

Column 3, line 33, change "arched" to -- arced --

Signed and Sealed this

Fourteenth Day of November 1978

[SEAL]

Attest:

RUTH C. MASON
Attesting Officer

DONALD W. BANNER
Commissioner of Patents and Trademarks